United States Patent
Ohtani (10) Patent No.: US 6,192,391 B1
(45) Date of Patent: Feb. 20, 2001

(54) PROCESS STOP METHOD AND APPARATUS FOR A DISTRIBUTED MEMORY MULTI-PROCESSOR SYSTEM

(75) Inventor: Atsuhisa Ohtani, Tokyo (JP)

(73) Assignee: NEC Corporation, Tokyo (JP)

( * ) Notice: Under 35 U.S.C. 154(b), the term of this patent shall be extended for 0 days.

(21) Appl. No.: 09/075,530

(22) Filed: May 11, 1998

(30) Foreign Application Priority Data

May 30, 1997 (JP) .................................................. 9-158017

(51) Int. Cl.$^7$ ...................................................... G06F 11/00
(52) U.S. Cl. ............................ 709/201; 709/106; 712/28
(58) Field of Search ................................... 709/106, 201, 709/223, 225, 226, 248, 249, 400; 714/11, 15, 21, 37; 712/28, 30

(56) References Cited

U.S. PATENT DOCUMENTS

| | | | |
|---|---|---|---|
| 5,802,267 | * 9/1998 | Shirakihara et al. | 714/15 |
| 5,923,832 | * 7/1999 | Shirakihara et al. | 714/37 |
| 6,026,499 | * 2/2000 | Shirakihara et al. | 714/11 |

OTHER PUBLICATIONS

Silva et al, "Global Ckeckpointing for Distributed Programs" pp. 155–162, IEEE 1992.*

* cited by examiner

Primary Examiner—Dung C. Dinh
Assistant Examiner—Dzung C. Nguyen
(74) Attorney, Agent, or Firm—Foley & Lardner (57) ABSTRACT

A process stop method and apparatus applicable to a distributed memory multi-processor system allows an efficient stop processing for the entry of a checkpoint during parallel processing where data are communicated between different nodes. The system comprises a plurality of nodes interconnected through a network, each of which is provided with a thread for parallel processing. Each of the nodes has a management process to manage its own thread engaged in parallel processing. When a request for a checkpoint is dispatched as an external command, the management process of a node whose node number is the smallest requests a stop from the thread of the same node. After confirming that the thread in question has stopped, the management process delivers a stop request to the management process of a node whose node number is the next smallest. Thus, the management process of a given node delivers a stop request to its own thread and another stop request to the management process of a node whose node number is the next smallest. The same process is repeated sequentially in an ascending order until all the nodes involved in parallel processing make a complete stop.

22 Claims, 4 Drawing Sheets

PROCESS STOP METHOD AND APPARATUS FOR A DISTRIBUTED MEMORY MULTI-PROCESSOR SYSTEM

BACKGROUND OF THE INVENTION

1. Field of the Invention

The present invention relates to a process stop method and apparatus. In particular, the present invention relates to a method and apparatus for performing a process stop in a checkpoint processing executed in a distributed memory system that includes of a plurality of nodes interconnected in a network, each of which has at least one thread for parallel processing.

2. Description of the Related Art

Japanese Unexamined Patent Publication No. 8-263317 shows a checkpoint/restart processing system for controlling the freezing order of plural processes which relate to the synchronous (or exclusive) control in the checkpoint processing.

However, the checkpoint/restart processing system is applied to a shared memory multi-processor system, and not to a distributed memory multi-processor system. In the distributed memory multi-processor system, each of the processors has an own (local) memory which is not accessible to any processes in the other processors. If the checkpoint/restart processing system applies to the distributed memory multi-processor system, there is a possibility that plural processes in different processors cannot perform a synchronization for the checkpoint processing, because a process in a processor, which is frozen and is a counterpart of the synchronization, cannot respond to the request of the synchronization from any processes in other processors. In such a situation, the processes in other processors continue waiting for a response from the frozen process, which of course they will not receive.

Japanese Unexamined Patent Publication No. 2-287858 shows a restart system for a distributed processing system. In this restart system, whenever the communication control part in a processor requests to receive/send data from/to the other processors, a program which causes the communication control part to execute such processing is saved as checkpoint data.

However, the restart system in the latter example cannot save checkpoint data at any given time. Further, the frequent saving of checkpoint data has the adverse effect of lowering the performance of parallel processing.

SUMMARY OF THE INVENTION

An object of the present invention is to provide a process stop method and apparatus applicable to a distributed memory multi-processor system having a plurality of nodes, in which the system performs parallel processing which requires data communication between different nodes. The method and apparatus enables a stop processing in such a way as to allow the efficient collection of a checkpoint.

Another object of the present invention is to provide a process stop method and apparatus applicable to a distributed memory multi-process system whereby, during normal operation for parallel processing which requires data communication between different nodes, a checkpoint/restart function is executed such that the performance of parallel processing is not impaired.

A still another object of this invention is to provide a process stop method and apparatus applicable to a distributed memory multi-process system that allows the collection of a checkpoint at any desired point of time with respect to the progress of parallel processing that requires data communication between different nodes.

In the present invention, a distributed memory multi-processor system includes a plurality of nodes interconnected in a network. Each of the nodes has at least one processor and a local memory. Each of the nodes includes a management process and a parallel processing process. The management process manages the threads. The threads are distributed into some or all of the nodes because of a parallel processing.

Firstly, when a user inputs an external command to a node which has the smallest node number among the network, a management process in the node sends a stop request to all threads in the node, and waits for the threads to stop. In response to the stop request from the management process, each of the threads stops and notifies the management process of its own stop.

When the management process in the node receives the notification from all threads in the node, the management process in the node sends the stop request to another management process in another node which has the next smallest node number among the network.

In a case that the thread is trying to communicate with another thread when the thread receives the stop request from the management process, the thread does not notify the management process of its own stop until the thread can confirm communication with the other thread.

However, in a case that the thread cannot confirm communication with the other thread within a predetermined time, and in a case that the node number of the thread is larger than the node number of the other thread, the thread stops and notifies the management process of its own stop.

In a case that the management process in the node cannot find the other management process in the other node which has the next smallest node number and should receive the stop request, the management process notifies the other management process in the other node, which has the smallest node number in the network, that all threads in all nodes are stopped.

Lastly, when the management process in the node which has the smallest node number in the network receives the notification that all threads in all nodes are stopped, the management process causes other management processes in other nodes to make a checkpoint data.

BRIEF DESCRIPTION OF THE DRAWINGS

The above-mentioned objects and advantages of the invention will become more apparent from the following detailed description when read in conjunction with the accompanying drawings, with like reference numerals indicating corresponding parts throughout, and wherein.

DETAILED DESCRIPTION OF THE PREFERRED EMBODIMENT

A detailed description will be given below regarding the embodiments of this invention with reference to attached figures. The hardware this invention is related to is a distributed memory multi-processor system that includes a plurality of nodes each of which contains a processor and a local memory, or a plurality of processors which share a common memory, and in which the plurality of nodes are interconnected through a network. In addition, the present invention makes it as a premise that the system have an internodal communication area to achieve a synchronization during communication or exclusion control.

Figure 1:
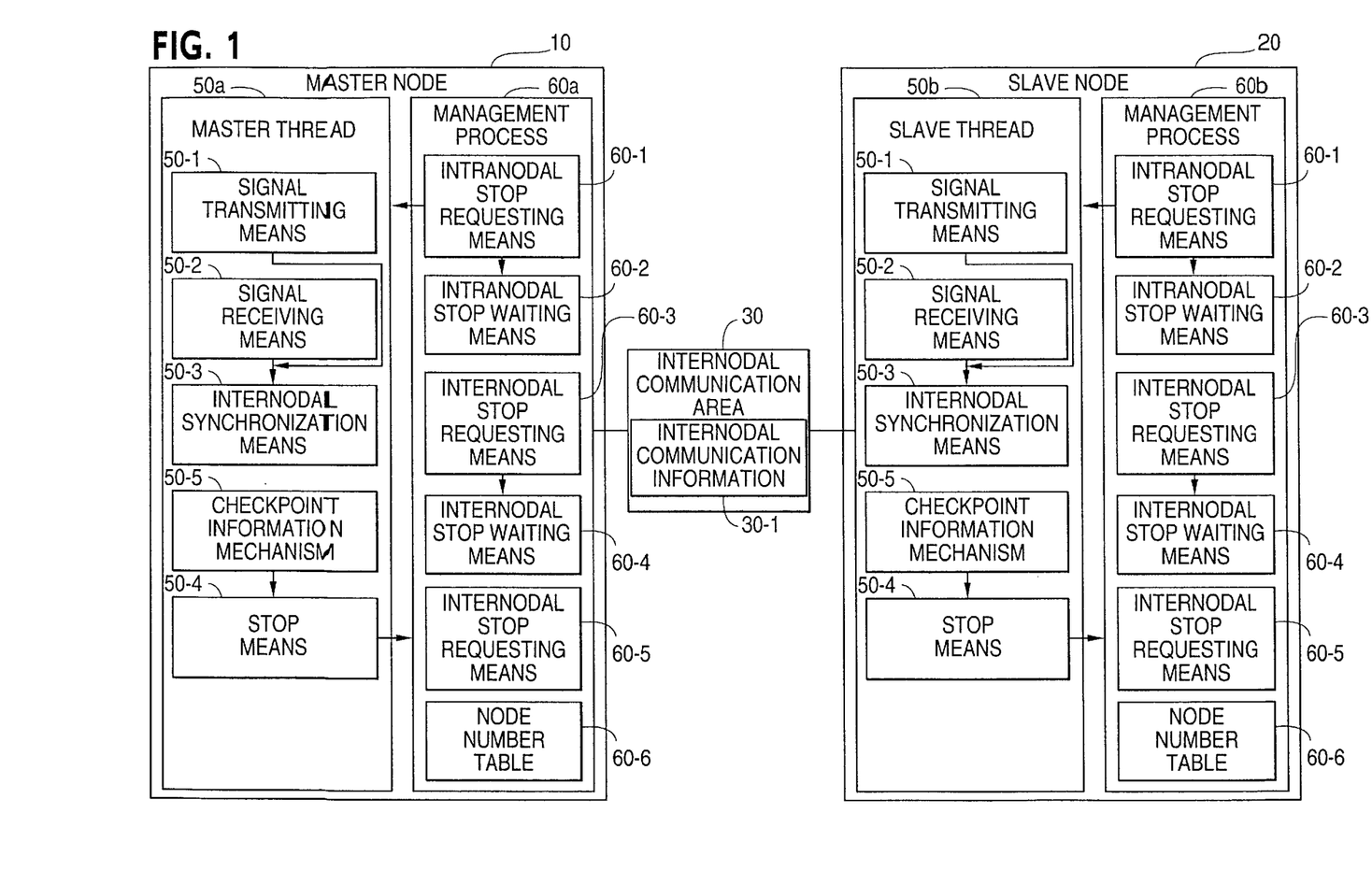
FIG. 1 is a block diagram indicating the outline of a distributed memory multi-processor system of one embodiment of this invention.

FIG. 1 gives a general outline of a distributed memory multi-processor system according to one example of the present invention. In FIG. 1, the present system includes a master node 10 in which a master thread exists, a slave node 20 in which only a slave thread or a node other than the master thread exists, and an internodal communication area 30.

The first embodiment may be so modified that said master node 10 and said slave node 20 can perform operations given below in such configuration in which a recording medium 100 such as a magnetic disk, a semiconductor memory, etc. is connected with the master node 10 and the slave node 20 and a program is read from said recording medium 100 to the master node 10 and the slave node 20.

The master node 10 contains a master thread 50a, and a management process 60a which manages a thread or threads in the master node 10.

The slave node 20 contains a slave thread 50b, and a management process 60b which manages a thread or threads in the slave node 10.

The master and slave threads 50a and 50b of master and slave nodes 10 and 20 contain respective signal transmitting means 50-1 and signal receiving means 50-2 to transmit/receive data to and from nodes. The master and slave threads 50a and 50b also contain internodal synchronization means 50-3 that are utilized by the signal transmitting and receiving means 50-1 and 50-2 during data communication, to achieve a synchronization with a partner node. The master and slave threads 50a and 50b further contain stop means 50-4 which, when they judge a current moment appropriate for safe stoppage, inform the management processes 60a and 60b of that moment for safe stoppage, which then stop the threads. The master and slave threads 50a and 50b also include checkpoint mechanisms 50-5.

The management processes 60a and 60b of master and slave nodes 10 and 20 contain respective intra-nodal stop-requesting means 60-1 which, when a stop request is generated in their respective node, executes a stop request by providing the respective thread with a checkpoint requesting flag. The management processes 60a and 60b also contain intranodal stop-waiting means 60-2, which wait until the thread for which the stop request has been delivered makes a stop. The management processes 60a and 60b further contain internodal stop requesting means 60-3 which, after confirming that the relevant management processes 60a or 60b has been informed of the stop request from the thread it manages, informs of the generation of the stop request to the management process of the node next in number. The management processes 60a and 60b still further contain internodal stop waiting means 60-4, which wait until all the nodes for which stop requests have been delivered make a complete stop. The management processes 60a and 60b also contain internodal stop means 60-5 which, after confirming that all the nodes for which stop requests have been delivered make a complete stop, informs the management processes of all involved nodes of the stoppage. Lastly, the management processes 60a and 60b contain node number tables 60-6, which store the node numbers of the nodes whose threads are involved in parallel processing and which are prepared from the maximally utilized node numbers notified by a user during the booting-up of parallel processing.

The internodal communication area 30 contains an internodal communication information 30-1, which is used by the internodal synchronization means 50-3, during internodal data communication by the transmitting and receiving means 50-1 and 50-2 of different nodes, to achieve a synchronization between the two nodes.

One feature of the embodiment of the present invention is in the construction of a system and a method such that, when a stop request is dispatched during data communication between a master node 10 and a slave node 20, an internodal synchronization means 50-3 of a given node that has been used by signal transmitting and receiving means 50-1 and 50-2 of the same node, can recognize, being confined only to its own node, whether a partner node has made a stop in response to the stop request for a checkpoint.

Next, referring to FIGS. 1 and 2, description will be given of the operation of the embodiment of the present invention.

FIG. 1 shows a system that includes only one slave node 20, but the present invention, in practice, is also applicable to a system that includes a plurality of slave nodes.

On booting-up of parallel processing, firstly, a node having a smallest node number of all nodes which are currently available is made a master node 10, and in that node is activated a management process 60a. This management process 60a determines, based on the maximum number of nodes to be used by a user, the nodes to be used as slave nodes, and write the node numbers of those slave nodes and of the master node into a node number table 60-6.

Then, the management process 60a in the master node 10 establishes a connection with the slave nodes whose node numbers have been written into the node number table 60-6, and copies the content of the table into the node table 60-6 belonging to the management process 60b within each of the involved slave nodes 20. Then, the management processes 60a and 60b of master and slave nodes 10 and 20 activate master and slave threads 50a and 50b necessary for parallel processing, respectively, and data communication between the nodes takes place to execute computation.

Later, when a checkpoint requesting command (e.g. from a user) requests a checkpoint in the parallel processing, a checkpoint process starts.

Figure 4:
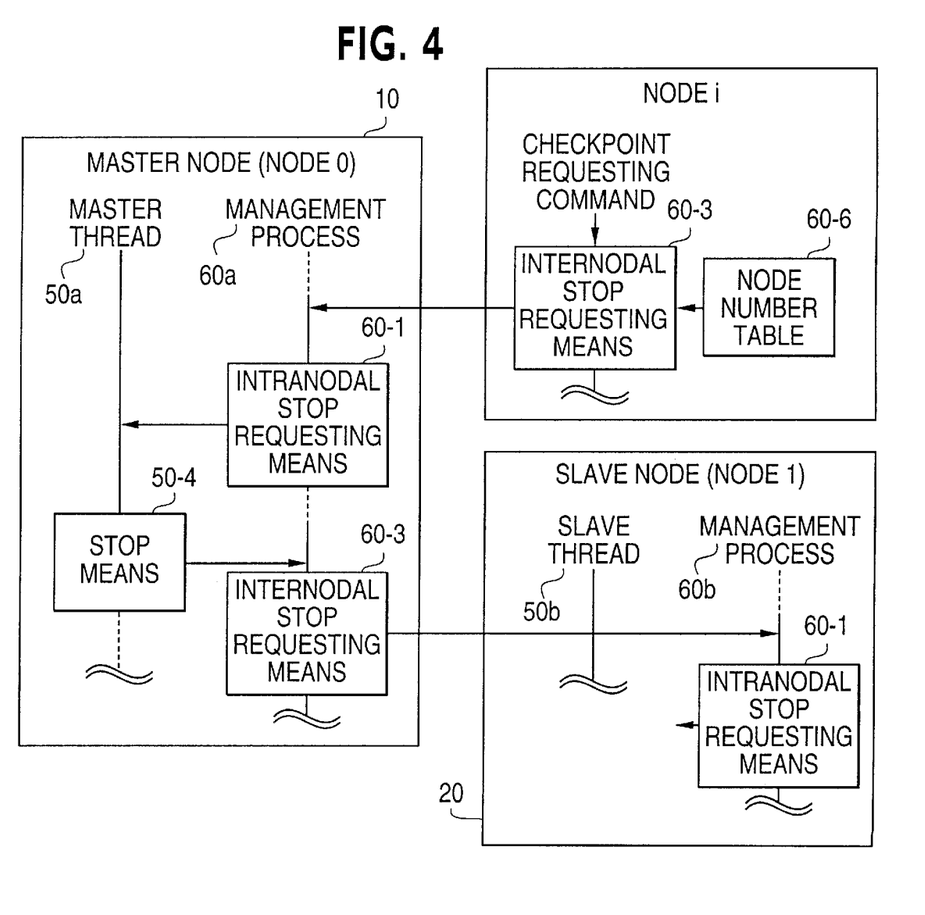
FIG. 4 is a block diagram showing connectivity between a special node and a master node according to the invention.

Referring now to FIG. 4, when a checkpoint requesting command is input by a user into node i, that command is input to the internodal stop requesting means 60-3 of node i to determine the master node 0 to send the checkpoint requesting command. The internodal stop requesting means 60-3 of the node i, by referring to the node numbers table 60-6, sends a signal to the management process of the master node 0, indicative of the checkpoint requesting command. The node i corresponds to a special node, which keeps track of processes in the parallel processing system. Node i may be a node separate from the master node 0, or alternatively it may be the master node 0. In the second situation, the checkpoint requesting command is input from the user to the master node 0.

The system is informed of the dispatch of a stop request for a checkpoint through an internodal stop requesting means 60-3 within the management process 60a of the master node 10. Then, the management process 60a delivers a stop request though an intranodal stop requesting means 60-1 within its own node to the master thread 50a. The management process 60a then waits, under the influence from the intranodal stop waiting means 60-2, until the master thread 50a makes a stop.

The master thread 50a, on receipt of the stop request from the intranodal stop requesting means 60-1, informs the management process 60a of its imminent stop through the stop means 50-4, so as to make a stop at the moment when it recognizes the arrival of the stop request. This occurs unless the master node 10 is engaged in data communication with other nodes (for example, at the moment when it has completed an interruption process). In that case, the master node finishes its data communication with the other node or nodes, and then stops.

Later, after having been informed of the imminent stop, the management process 60a of the master node 10 examines the node number table 60-6 using the internodal stop requesting means 60-3. The management process 60a finds the slave node 20 whose node number is the next smallest with respect to the number of the master node 10, and delivers the stop request to the management process 60b of that slave node 20. Then, the management process 60a of the master node waits, under the influence from the internodal stop waiting means 60-4, until the threads of all involved nodes for parallel processing which are to be checked make a complete stop.

After having received the stop request from the master node 10, the management process 60b of the slave node 20 delivers the stop request through the intranodal stop requesting means 60-1 to the slave thread 50b. The management process 60b of the slave node 20 waits, under the influence from the intranodal stop waiting means 60-2, until the slave thread 50b makes a stop.

Like the master thread 50a, the slave thread 50b informs the management process 60b of its imminent stop through the stop means 50-4. The management process 60b of the slave node 20 make a stop at the moment when it recognizes the arrival of stop request, unless it is engaged in data communication with other nodes.

Described hereinbelow are the processes that occur when the slave node receives a stop signal when it is engaged in data communication.

Figure 2:
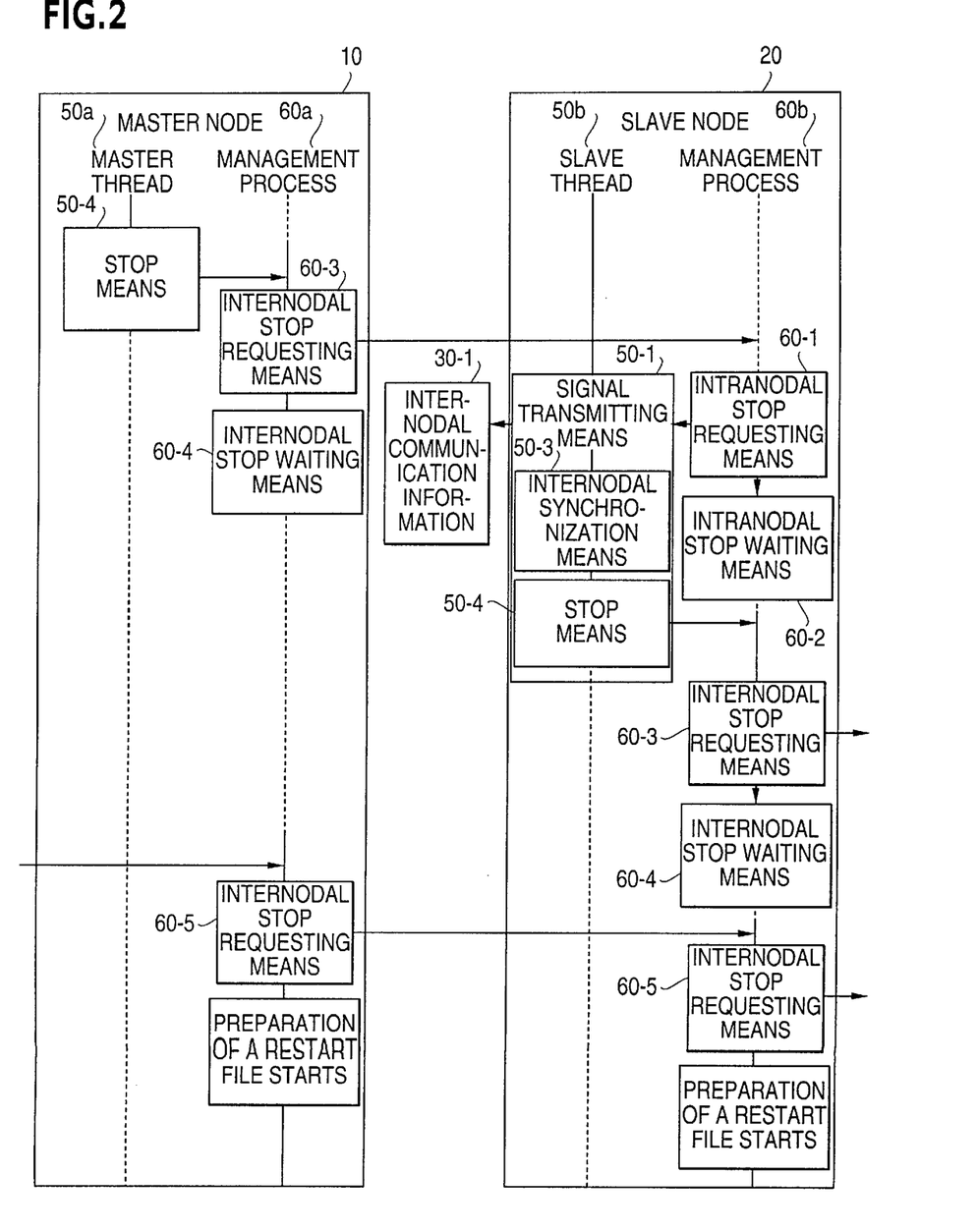
FIG. 2 illustrates the operation according to the present invention during data communication between two different nodes.

FIG. 2 depicts a case where the master thread 50a and slave thread 50b are engaged in data communication. In this case, the master thread 50a has made a stop in response to a stop request before it receives data through the signal receiving means 50-2, while the slave thread 50b has started to transmit data through the signal transmitting means 50-1 before it receives the stop request. However, because the master thread 50a has made a stop, the slave node 50b cannot discontinue its data transmission.

In order to achieve a synchronization with the partner node, the thread that is engaged in data communication refers to the flag within the internodal communication information area 30-1 through a loop set to repeat at specified intervals in advance, to determine whether the partner node is ready to transmit or receive data using its signal transmitting or receiving means 50-1 or 50-2.

After confirming through the loop that a synchronization has been achieved, the thread in question, at the moment when the signal transmitting means 50-1 or signal receiving means 50-2 has completed data communication, informs of its imminent stop to the management process 60b of slave node 20 through the stop means 50-4, to make a stop.

However, there are cases where a synchronization with the partner node is not achieved within the specified period of the loop cycle, and the time necessary for synchronization has expired. To meet such situations, the internodal synchronization means 50-3, when it finds that the partner node (master node 10) has a smaller node number than the node to which it belongs (slave node 20) as shown in FIG. 2, checks whether a stop request has been dispatched or not. This check is performed because, since the partner node has a smaller node number, it may happen that the thread of partner node has made a stop in response to a stop request. When it finds that a stop request has been dispatched, it informs, as a process of data communication, of its imminent stop through the stop means 50-4 to the management process 60b of slave node 20, to make a stop.

When the internodal synchronization means 50-3 finds that the node to which it belongs has a smaller node number than the partner node, it will not stop during data communication because it is unlikely that the thread of the partner node has stopped already, and continues to wait until a synchronization is established with the thread of the partner node. Then, at the moment when data communication through the signal transmitting means 50-1 or signal receiving means 50-2 has been completed, it informs the management process 60b of slave node 20 of its imminent stop through the stop means 50-4.

The management process 60b of slave thread 50b that receives a stop request through any one of above processes, refers to the node number table 60-6, and, when it finds that there are other slave nodes available, delivers the stop request through the internodal stop requesting means 60-3 to the management process of a node whose node number is the next smallest, and waits, under the influence from the internodal stop waiting means 60-4, until the threads of all involved nodes that are to receive checkpoints make a complete stop.

When the management process 60b of slave node 20 finds that there is no slave node available, it informs the management process 60a of master node 10, through the internodal stop notifying means 60-5, that the threads of all the nodes involved have made a stop. Then, the master node 20 informs, through the internodal stop notifying means 60-5, to all the nodes involved one after another, in order that the thread of all the nodes have stopped.

Through this operation, the management processes 60a and 60b of master node 10 and slave node 20 can be ready to prepare restart files.

Because the above processes ensure that no error in synchronization will ensue between the nodes on completion of the entry of a checkpoint, restart by this method can be readily applied to the checkpoint/restart method disclosed in Japanese Unexamined Patent Publication No. 8-263317, which is not specifically directed to a distributed memory multi-processor system. In particular, the management process 60a of a master node 10 establishes a connection with the management process 60b of a slave node 20, and informs the latter of the dispatch of a restart request. The management process of each involved node executes the restart process separately as disclosed in Japanese Unexamined Patent Publication No. 8-263317, and the management process 60b of each slave node 20 informs, on completion of the restart process of its own node, of that completion to the management process 60a of master node 10, to complete the restart process.

Figure 3:
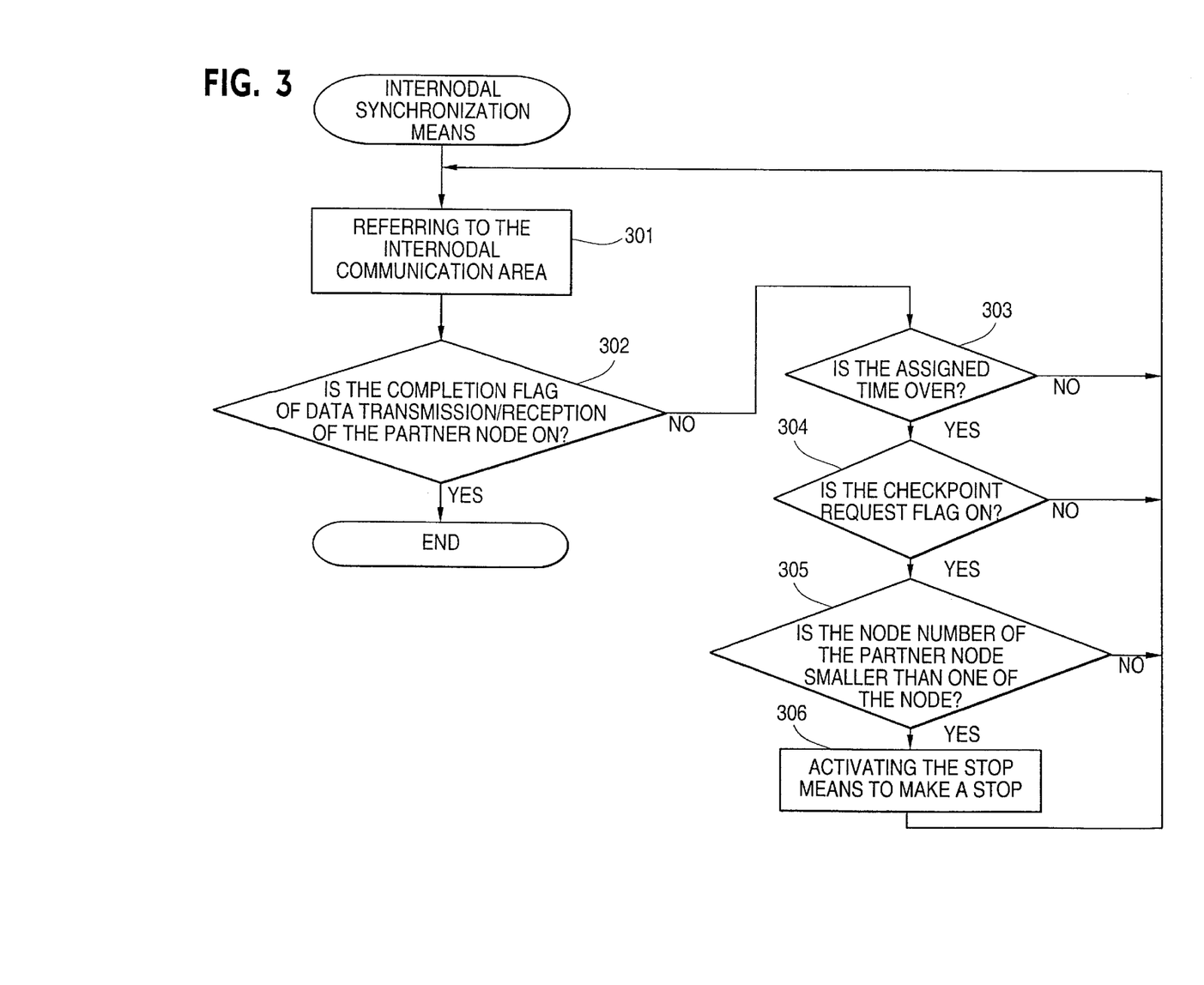
FIG. 3 is a flowchart illustrating the processes which the internodal synchronization means execute in the method according to the present invention.

FIG. 3 is a flowchart to explain the processes executed by the internodal synchronization means 50-3 which is utilized by the signal transmitting and receiving means 50-1 and 50-2 during data communication.

During data communication for ordinary parallel processing in which no checkpoint request is dispatched, according to the sequences as depicted in FIG. 3, the following processes will be executed.

A node to transmit a signal sets a flag to signify the readiness for data transmission in the internodal communication information area 30-1 by sending an appropriate command from the signal transmitting means 50-1 through the internodal synchronization means 50-3. At the same time, by referring to the internodal communication information area 30-1 (step 301), the node checks whether a flag signifying the completion of signal reception has been set by a node to receive the signal (step 302.)

When it finds that the flag signifying the completion of signal reception is not set there as yet, which indicates that a synchronization is not established between the two nodes, the node to transmit a signal checks whether the time necessary for signal transmission has expired or not (step 303). When it finds that the time has not expired yet, it refers again to the internodal communication area 30-1, and repeats the steps 301 to 303 until a synchronization is established between the two nodes.

On the other hand, the node to receive the signal gets access to the internodal communication area 30-1, from the signal receiving means 50-2 through the internodal synchronization means 50-3, to refer to its content (step 301), and checks whether a flag signifying the readiness for data transmission has been set or not (step 302). When it finds that the flag has not been set as yet, like the node to transmit the signal, it checks whether the time necessary for signal reception has expired or not (step 303) because a synchronization is not established yet between the two nodes. When it finds that the time has not yet expired, it refers again to the internodal communication area 30-1, and repeats the steps 301 to 303 until a synchronization is established between the two nodes under study.

When either of the two nodes, one to transmit a signal and the other to receive a signal, repeats the steps 301 to 302 until a synchronization is established between the two, and a stop request for a checkpoint is dispatched to the node, the following processes will ensue. For example, as shown in FIG. 2, when the master thread 50a to receive a signal stops its operation under the influence of the checkpoint interruption, before it starts signal reception through the signal receiving means 50-2, the thread 50b of the slave node to transmit a signal repeats the steps 301 to 303 until time necessary for signal reception has expired.

Later, the thread of the slave node checks whether a flag requesting a checkpoint has been set through the intranodal stop requesting means 60-1 by the management process 60b of the same slave node 20 (step 304.) When it finds that a flag requesting a checkpoint has been set, it refers to the node number table 60-6, and compares the node numbers of the node to receive a signal and the node to transmit a signal (step 305). When it finds that the node to transmit a signal has a smaller node number than does the node to receive a signal, it concludes that the node to transmit a signal has stopped in the presence of the checkpoint, and informs of the conclusion through the stop means to the management process 60b of slave node 20, to make a stop (step 306).

In the above embodiment, for ease in explanation, a node in which a master thread 10 exists is assigned the smallest node number, and a stop request is delivered one after another in an ascending order of node numbers. Thus, a node to which a stop signal is delivered can recognize what nodes have stopped already, and what nodes have not yet stopped. Accordingly, a given node can judge by itself without resorting to information from extra-nodal sources whether the current moment is appropriate for a stop or not.

Next, a detailed description will be given of the present invention with reference to concrete examples.

In this example, a master node 10 is given beforehand a node number of 0, while a slave node 20 is given a node number of 1. FIG. 2 shows that the master thread 50a of master node 10 and the slave thread 50b of slave node 20 are going to start data communication, and that the master thread 50a has made a stop in response to a stop request before it starts to receive data through a signal receiving means 50-2. Meanwhile, the slave thread 50b has started to transmit data before it receives a stop request but, finding that the master thread 50a has made a stop, is unable to find how to terminate data transmission.

To handle such a situation, the slave thread 50b, in order to achieve an internodal synchronization, gets access through an internodal synchronization means 50-3 by way of a loop repeated at specified intervals to an internodal communication information area 30-1 (so as to perform periodic polling), and examines whether the master thread 50a has started to receive data through its signal receiving means 50-2.

On the other hand, the master thread 50a has stopped in response to the stop request for a checkpoint, remains inactive and will not receive data. Therefore, as shown in FIG. 3, while the slave thread 50b repeats the steps 301 to 302, the time assigned to data communication expires, and the sequence of events proceeds to step 304, where the slave thread 50b refers to the checkpoint information mechanism 50-5 and confirms that a checkpoint requesting flag has been set.

Then, in step 305, assuming that the master node 50a or a node to receive data is given a node number of 0 while the slave node 50b or a node to transmit data is given a node number of 1, and thus the master node has a smaller node number, the slave thread 50b, judging that the master node 50a may have stopped already, informs the management process 60b of the slave thread 50b of its imminent stop through the stop means 50-4, so as to make a stop in the slave node.

The present invention has been detailed above with reference to preferred embodiments and examples, but the scope of this invention is not necessarily limited to the above embodiments and examples. The embodiments of this invention mainly concern with parallel processing where data are communicated between two nodes of which one takes the position of a slave node, but the present invention can be utilized with the same applicability to parallel processing that incorporates a plurality of slave nodes, and does not impose any limit to the number of slave nodes to be involved.

The present invention does not also impose any limit to the number of threads within each node. Both the master and slave nodes may have a plurality of threads, although to each node only one management process is assigned regardless of the number of threads contained therein. In the latter case, the management process, after confirming that it has received stop notices through the stop means 50-4 from all the threads within its own node, informs the management process of the next node of the complete reception of all relevant stop notices through the internodal stop requesting means 60-3.

Further, the present method of data communication between different nodes can be applied to data communication between any arbitrary combination of different nodes.

As is apparent from above description, according to the process stop method of this invention that is applied to a distributed memory multi-processor system, the following advantages will be obtained.

Firstly, as stop processing takes place sequentially from a node whose node number is the smallest to other similarly numbered nodes in an ascending order, a given node can recognize, through an internodal synchronization means that is engaged in data communication, whether a partner node has already stopped or not, without examining the state of that partner node through, say, another communication, and thus can determine by itself whether it can safely make a stop without interfering with the system at large. Thus, when a distributed memory multi-processor system incorporating multiple nodes is engaged in data communication through parallel processing, being dependent on the operation of many threads, and a stop request for a checkpoint is dispatched, the involved nodes can be stopped safely, requiring only time and energy proportional with the number of those nodes. Thus, an efficient stop processing is ensured.

Secondly, only when a request for a checkpoint is dispatched, the system performs a checkpoint processing including a stop processing. Hence, when a distributed memory multi-processor system makes an ordinary parallel processing, the stop processing for a checkpoint does not interfere with the principal function of the system, and does not impair the overall performance.

Thirdly, as a request for a checkpoint is dispatched as an external command, during a parallel processing performed by a distributed memory multi-processor system, collection of the checkpoint can take place at any desired point of time.

What is claimed is:

1. A process stop method for a distributed memory multi-processor system that includes a plurality of nodes interconnected into a network, each of said nodes being provided with a thread for parallel processing, wherein each of said nodes has a management process to manage its own thread to engage in parallel processing, the method comprising the steps of:

when a checkpoint is requested in the parallel processing as an external command, requesting, by the management process of a node whose node number signifies a highest ranking node, a stop from a thread of the highest ranking node;

confirming that the thread of the highest ranking node has stopped;

after confirming that the thread of the highest ranking node has stopped, delivering a stop request to the management process of a next highest ranking node with respect to the highest ranking node; and delivering, by the management process of a given node, a stop request to a thread of the given node and another stop request to the management process of a node whose node number is next highest in ranking with respect to the given node, and repeating the process sequentially in an ascending order until all of said nodes involved in the parallel processing make a stop.

2. A process stop method as described in claim 1, wherein the management process of each of said nodes includes:

an intranodal stop requesting means to request a stop from the thread of said each node in response to the stop request;

an intranodal stop waiting means to wait until all the threads within said each node makes a stop; and an internodal stop requesting means to request a stop from the management process of the next highest ranking node.

3. A process stop method as described in claim 2, wherein the management process includes:

an internodal stop waiting means for waiting until the threads of all said nodes involved in the parallel processing make a stop; and an internodal stop means for informing, on completion of the stop of all of said nodes involved, of that stoppage to each node.

4. A process stop method as described in claim 3, wherein the respective thread of each node includes:

an internodal synchronization means for achieving a synchronization with at least one partner node for data communication;

a checkpoint mechanism for storing information regarding whether a stop request has been delivered through said intranodal stop requesting means by said management process;

signal receiving/transmitting means for communicating data with said at least one partner node; and a stop means for informing of the imminent stop of the relevant thread to the relevant management process and then to stop the thread in question, wherein the internodal synchronization means, when time necessary for synchronization with said at least one partner node for data communication has expired, gets access to the checkpoint mechanism to determine whether a stop request has been delivered or not, and, when it finds that a stop request has been delivered, compares its own node number with that of said at least one partner node, and, when it finds that its own node number is smaller than that of said at least one partner node, it stops its own thread through the stop means.

5. A process stop method as described in claim 3, wherein the management process has a node number table that includes a list of node numbers of the nodes whose threads are involved in the parallel processing, and wherein the internodal stop requesting means of the management process delivers a stop request to the management process of a node whose node number is the next highest ranking, after having referred to the node number table.

6. A process stop method as described in claim 4, wherein the management process has a node number table that includes a list of node numbers of the nodes whose threads are involved in the parallel processing, and wherein the internodal stop requesting means of the management process delivers a stop request to the management process of a node whose node number is the next highest ranking, after having referred to the node number table.

7. A process stop method as described in claim 4, wherein the management process has the node number table to include the list of node numbers of the nodes whose threads are involved in the parallel processing, and wherein the internodal stop requesting means of the thread compares its node number with that of said at least one partner node by referring to the node number table.

8. A process stop method as described in claim 4, wherein the system includes an internodal communication area to set information regarding the completion of signal transmission or signal reception during data communication, and wherein the internodal synchronization means, when information regarding the completion of signal transmission or signal reception has been set in the internodal communication area within a specified time, establishes a synchronization with said at least one partner node, and, when the information in question has not been set in the specified time, gets access to the checkpoint mechanism to see whether a stop request has been delivered, and, when it finds that a stop request has been delivered, it compares its own node ranking with that of said at least one partner node, and, when its own node has a lower ranking, it stops its own thread through the stop means.

9. A process stop method for a distributed processing system that has a plurality of nodes that are interconnected with each other in a network, wherein said nodes have a particular ranking with respect to each other, the method comprising the steps of:

a) transmitting data from one of said nodes to another of said nodes to perform a parallel processing task based on a thread involving at least two of said nodes;

b) determining, by said one of said nodes, if said another of said nodes has acknowledged receipt of the data transmitted in the step a);

d) if said another of said nodes has not acknowledged receipt of the data within a fixed time period, checking to determine if said another node has been stopped by an externally-received stop request to said another node, wherein said checking is only performed if said another node has a higher ranking than said one node; and e) if said checking results in said another node having been stopped, stopping said one node and informing the stopping of said one node to said intranodal synchronizing unit to be used by others of said at least two of said nodes involved in the parallel processing task, wherein, if said another node has not acknowledged receipt of the data within a fixed time period and if said another node does not have a higher ranking than said one node, determining that said another node has not received said data due to something other than a stop request sent to said another node, and returning to step a) to retransmit the data to said another node.

10. A process stop method for a distributed processing system that has a plurality of nodes that are interconnected with each other in a network, wherein said nodes have a particular ranking with respect to each other, the method comprising the steps of:

a) receiving, by one of said nodes, a stop request for stopping a thread involving at least another node, said stop request being provided from an external source with respect to the processing system;

b) based on said stop request, determining whether any current data communication are being performed by said one node to said at least another node;

c) if the determination in step b) is that no other current data communications are being performed, stopping operation at said one node with respect to said thread;

d) if the determination in step b) is that other current data communications are being performed by said one node, sending an indicator to an intranodal synchronizing unit accessible by at least said one node and said at least another node in said processing system, said indicator being used by said at least another node to determine that said one node will not at present participate in any communications with said at least another node due to said stop request resulting in stoppage at said one node.

11. The process stop method as described in claim 10, further comprising the steps of:

e) attempting, by said at least another node, to establish synchronization with said one node when said other current data communication is being performed; and f) if synchronization cannot be established within a fixed time period, checking said indicator for said one node in said intranodal synchronization device to determine if said one node has stopped, wherein the checking in step f) is only performed by said at least another node if said one node has a higher ranking than said at least another node.

12. A process stop apparatus for a distributed memory multi-processor system that includes a plurality of nodes interconnected into a network, each of said nodes being provided with a thread for parallel processing, wherein each of said nodes including a management process for managing a thread of each of said nodes, said management process for each of said nodes comprising:

intranodal stop requesting means for requesting a stop from said thread of each of said nodes in response to a stop request received by each of said nodes;

intranodal stop waiting means for waiting until every thread within each of said nodes makes a stop; and internodal stop requesting means for request a stop from the management process of a lower ranking node.

13. A process stop apparatus as described in claim 12, wherein the management process of each of said nodes further comprises:

internodal stop waiting means for waiting until the threads of all of said nodes involved in the parallel processing make a stop; and internodal stop means for informing, on completion of the stop of all of said nodes involved in the parallel processing, of the stop of all of said nodes to each of said nodes.

14. A process stop apparatus as described in claim 13, wherein the respective thread of each of said nodes comprises:

an internodal synchronization means for achieving a synchronization with at least one partner node for data communication;

a checkpoint mechanism for storing information indicative of whether a stop request has been delivered through said intranodal stop requesting means by said management process;

signal receiving/transmitting means for communicating data with said at least one partner node; and stop means for informing of the imminent stop of the relevant thread to the relevant management process and then to stop the thread in question, wherein the internodal synchronization means, when time necessary for synchronization with said at least one partner node for data communication has expired, gets access to the checkpoint mechanism to determine whether a stop request has been delivered or not, and, when the internodal synchronization means determines that a stop request has been delivered, compares its own node number with that of said at least one partner node, and, when it finds that its own node number is such said at least one partner node is a lower ranking node with respect to its own node, said internodal synchronization means stops its own thread through the stop means.

15. A process stop apparatus as described in claim 13, wherein the management process of each of said nodes further comprises:

a node number table that includes a list of node numbers of the nodes whose threads are involved in the parallel processing, wherein the internodal stop requesting means of the management process delivers a stop request to the management process of a node whose node number is the next lower in ranking, after having referred to the node number table.

16. A process stop apparatus as described in claim 14, wherein the management process of each of said nodes further comprises:
a node number table that includes a list of node numbers of the nodes whose threads are involved in the parallel processing,
wherein the internodal stop requesting means of the management process delivers a stop request to the management process of a node whose node number is the next lower in ranking, after having referred to the node number table.

17. A process stop apparatus as described in claim 14, wherein the management process of each of said nodes further comprises:
a node number table to include the list of node numbers of the nodes whose threads are involved in the parallel processing,
wherein the internodal stop requesting means of the thread compares its node number with that of said at least one partner node by referring to the node number table.

18. A process stop apparatus as described in claim 14, further comprising:
an internodal communication area configured to store information indicative of the completion of signal transmission or signal reception during data communication,
wherein the internodal synchronization means, when information regarding the completion of signal transmission or signal reception has been stored in the internodal communication area within a specified time, establishes a synchronization with said at least one partner node, and, when the information has not been set within the specified time, accesses the checkpoint mechanism to determine whether a stop request has been delivered, and, when the internodal synchronization means determines that the stop request has been delivered, the internodal synchronization means compares its own node ranking with that of said at least one partner node, and, when its own node has a lower ranking, the internodal synchronization means stops its own thread through the stop means.

19. A process stop apparatus as described in claim 18, wherein the internodal communication area is separate from each of said nodes in said distributed memory multiprocessor system.

20. At least one recording medium for storing a program causing a plurality of nodes interconnected within a network to execute a process stop processing, each of said nodes being provided with one or more threads for parallel processing, wherein each of said nodes further being provided with a management process for managing said one or more threads of said each of said nodes, said program comprising the steps of:
requesting a stop from said thread of each of said nodes in response to a stop request received by one of said nodes;
waiting until an indication has been received that every thread within said one of said nodes has made a stop; and
outputting a request for a stop to the management process of a node that is a next lower ranking node with respect to said one of said nodes.

21. At least one recording medium for storing a program causing a plurality of nodes interconnected within a network to execute a process stop processing, each of said nodes being provided with one or more threads for parallel processing, wherein each of said nodes further being provided with a management process for managing said one or more threads of said each of said nodes, said program comprising the steps of:
receiving, by one of said nodes, a stop request for a particular thread;
providing a checkpoint requesting flag to said particular thread based on said stop request;
waiting until an indication has been received that said particular thread has made a stop;
after said indication has been received that said particular thread has made the stop, informing a next lower ranking node of the stop request;
making a determining that all of said nodes involved in said particular thread that have a lower ranking than said one of said nodes have made a stop, the determination being made based on the stop request being relayed to said all of said nodes involved in said particular thread; and
after determining that said all of said nodes involved in said particular thread that are lower ranking than said one of said nodes have made the stop, stopping said one node and informing a next higher ranking node involved in said particular thread of the stop of said one node.

22. At least one recording medium for storing a program causing a plurality of nodes interconnected within a network to execute a process stop processing, each of said nodes being provided with one or more threads for parallel processing, wherein each of said nodes further being provided with a management process for managing said one or more threads of said each of said nodes, said program comprising the steps of:
receiving a checkpoint request in the parallel processing;
based on the checkpoint request, requesting a stop from a thread of a highest ranking node of said plurality of nodes;
confirming that the thread of the highest ranking node has stopped;
delivering a stop request to a next highest ranking node with respect to the highest ranking node; and
determining when all of said nodes that are involved in the parallel processing have made a stop, so as to achieve an orderly process stop of the parallel processing.

* * * * *